United States Patent [19]

Strubbe

[11] Patent Number: 5,432,561
[45] Date of Patent: Jul. 11, 1995

[54] SYSTEM FOR AUTOMATICALLY ACTIVATING PICTURE-IN-PICTURE WHEN AN AUXILIARY SIGNAL IS DETECTED

[75] Inventor: Hugo J. Strubbe, Yorktown Heights, N.Y.

[73] Assignee: North American Philips Corporation, New York, N.Y.

[21] Appl. No.: 332,509

[22] Filed: Oct. 31, 1994

Related U.S. Application Data

[63] Continuation of Ser. No. 859,200, Mar. 27, 1992, abandoned.

[51] Int. Cl.⁶ .............................................. H04N 5/45
[52] U.S. Cl. ...................................... 348/565; 348/706
[58] Field of Search .................. 358/183, 22 PIP, 188, 358/191.1; H04N 5/45; 348/565, 706, 734, 735, 731

[56] References Cited

U.S. PATENT DOCUMENTS

| | | |
|---|---|---|
| 4,845,564 | 7/1989 | Hakamada et al. . |
| 4,984,082 | 1/1991 | Okamura ........................ 358/22 PIP |
| 4,985,755 | 1/1991 | Shimoda et al. ............... 358/22 PIP |
| 5,029,007 | 7/1991 | Spiero . |
| 5,032,926 | 7/1991 | Imai et al. . |
| 5,161,019 | 11/1992 | Emanuel ............................ 348/565 |

FOREIGN PATENT DOCUMENTS

| | | |
|---|---|---|
| 0271055 | 12/1987 | European Pat. Off. . |
| 0159990 | 7/1987 | Japan .............................. H04N 5/45 |
| 1315064 | 12/1989 | Japan . |
| 0162184 | 7/1991 | Japan .............................. H04N 5/45 |
| 0167975 | 7/1991 | Japan .............................. H04N 5/45 |
| 2226732 | 7/1990 | United Kingdom . |

OTHER PUBLICATIONS

Audio Video—"Hitachi VT-1570A: The First VCR Capable of P-IN-P and Memory Stop" Aug. 1986, pp. 36 and 37.

Fachlich Bldung—"Derzeitige Und Zukunftige Verbindungen Zwischen Fernseher Und Externen Videogeraten" Funk-Technik 38 (1983), pp. 208-212.

Primary Examiner—Victor R. Kostak
Attorney, Agent, or Firm—Laurie Gathman; Michael E. Marion

[57] ABSTRACT

A television receiver comprising an improved interface circuit which automatically activates a PIP display of an auxiliary input (for example a videocassette or videodisc) when such an input is detected.

5 Claims, 3 Drawing Sheets

SYSTEM FOR AUTOMATICALLY ACTIVATING PICTURE-IN-PICTURE WHEN AN AUXILIARY SIGNAL IS DETECTED

This is a continuation of application Ser. No. 07/859,200, filed Mar. 27, 1992, now abandoned.

BACKGROUND OF THE INVENTION

The invention relates to a system for automatically activating picture-in-picture (PIP) circuitry coupled to or present in a television receiver, when an auxiliary signal is detected at an auxiliary video input. Such an auxiliary signal can be supplied by a video cassette recorder (VCR), optical disc recorder or other types of video inputs.

In existing televisions having PIP abilities, one or more auxiliary inputs are available besides the RF signal input to the receiver's tuner supplied for connection to a cable system or antenna. An auxiliary source of video/audio, such as a VCR, videodisc player, computer, etc., is connected to one of the auxiliary inputs and is thus made available to the receiver for display as either the main picture display or the PIP display. In normal operation such receivers, when first turned on, display the tuner input as a full screen display. The PIP is off until manually activated by the user. If the user desires to view the auxiliary program source, either as a full screen display or a PIP display, he must choose these options using an on-screen menu driven selection process which can be relatively complicated and time consuming, but nevertheless necessary, if the viewer wants to access the auxiliary source of programming.

When the VCR, or other auxiliary source, is activated, the auxiliary source is unavailable for display until the user take the following steps:

1) chooses an input menu with the remote control,
2) selects, using a series of sub-menus, the auxiliary input for the full screen display.

Using another sub-menu, the PIP feature can be activated (showing the tuner input when the auxiliary input is on full screen display) and using the "swap" button of the remote control, the auxiliary input can be placed in PIP and the tuner input placed on the full screen display, or vice versa.

Unless these or similar steps are taken, display of the auxiliary source does not take place. In other words, the user doesn't see the auxiliary program. This leads to confusion and frustration for viewers without the skill or desire to deal with the menu process.

A similar situation exists when both the auxiliary input and the tuner input are being displayed (one input in full screen display and one in PIP display), in prior art systems. If the auxiliary source is turned off, a blank display or "snow" is present on the respective display until the user selects an appropriate input via the menus as described above, leading to further annoyance to the user.

Since most receivers "remember" which input was provided to the full screen display at the time the receiver is turned off, and automatically provide that input to the full screen display upon turning on the receiver again, a blank screen or "snow" will be displayed on the full screen display if the receiver is turned off while the auxiliary input is provided to the full screen display, and the receiver, but not the auxilary input source, is turned back on again. When this happens, the user must go through the menu process to re-select the tuner as the full screen display.

It is the object of the instant invention therefore, to provide an improved user/receiver interface.

SUMMARY OF THE INVENTION

The invention comprises a circuit which can be part of a television receiver or used in conjunction with a television receiver, which monitors the auxiliary inputs of the television receiver and which comprises signal detection means which automatically, upon detection of a signal on the auxiliary input, activates the PIP function of the receiver and directs the auxiliary signal present at the auxiliary input, to the PIP display. Unlike existing receivers which require manual activation of some sort by the viewer, in order to view an auxiliary program source (i.e. a prerecorded video tape), the presence of an auxiliary input (VCR is turned on) will automatically present the viewer with confirmation that the auxiliary input is available for viewing, i.e. by the automatic activation of the PIP display.

The viewer can then switch the PIP display to the main screen display (placing at the same time, the tuner input on PIP) using the "swap" function of the receiver, and can deactivate PIP if desired, in order to watch the prerecorded program.

These and other features will become apparent in the following detailed description.

DETAILED DESCRIPTION OF THE PREFERRED EMBODIMENT OF THE INVENTION

Figure 1:
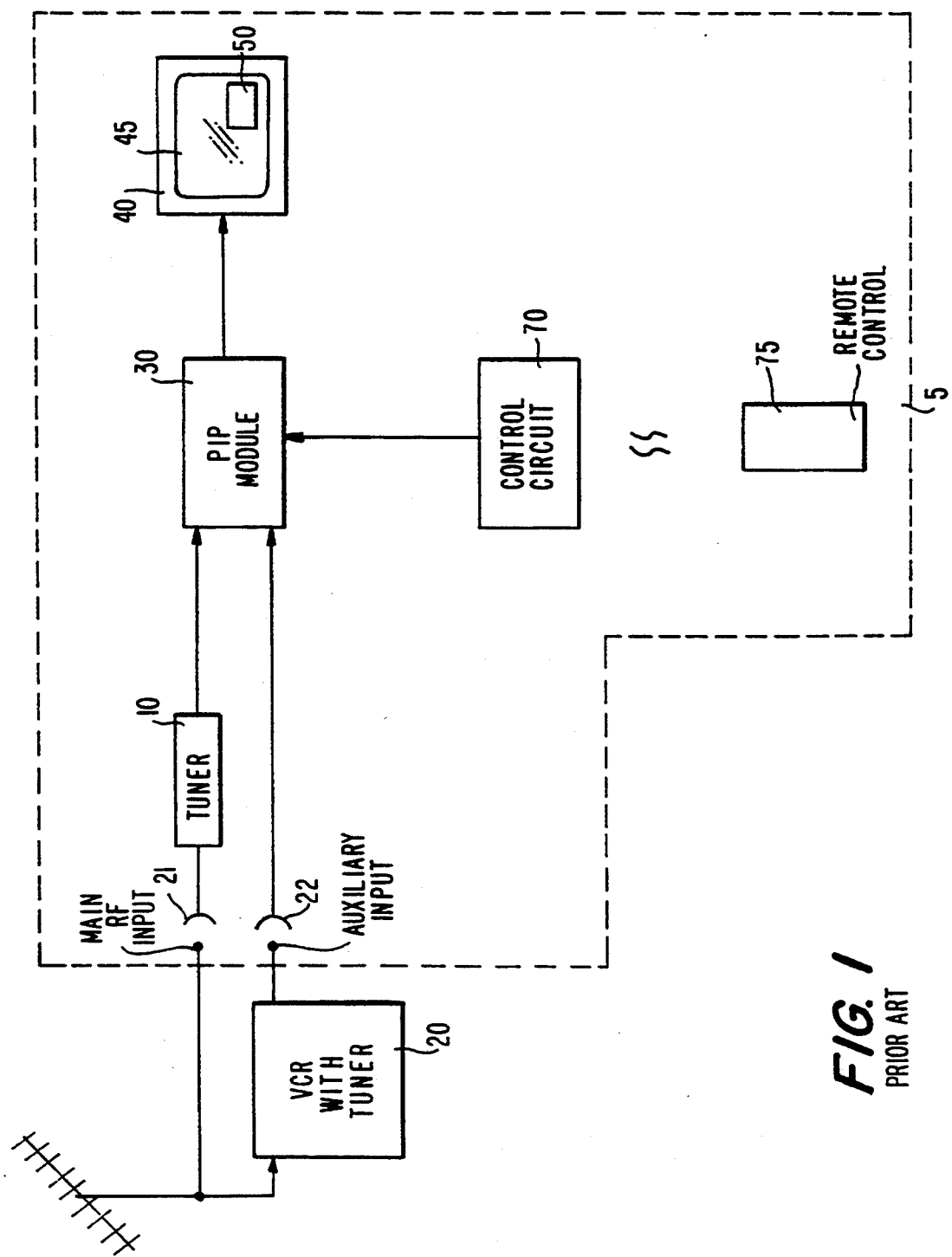
FIG. 1 is a block diagram of a prior art television system.

FIG. 1 is a block diagram describing a prior art television system including a receiver 5 comprising a tuner 10, a PIP module 30, a control circuit 70 and a display screen 40 featuring a full display portion 45 and a PIP display portion 50. A receiver 7 comprising the invention, as described in FIG. 2, includes, in addition to these components, a video signal presence detector 60 and a modification to the control code used by the control circuit 70 to implement the flow chart described in FIG. 3 in order to respond to the signal presence detector 60 as described below.

The operation of a PIP module 30 differs slightly in different receivers, but such PIP devices are well known to those skilled in the art. In general however receiver 5 has an RF input 21 which normally couples a source of RF, which can either be a television antenna (as shown), or an input from a cable, microwave, fiber optic or satellite television system, to tuner 10. The output of tuner 10 is usually coupled to one input of PIP module 30. In addition, one or more auxiliary inputs are provided for base band programming sources such as VCRs, computers etc. and are normally coupled to a second input of PIP module 30. The control circuit 70 is usually a microprocessor based device controlled by a simple microcode to interact with a user device such as remote control 75. The control circuit 70, in response to the viewer's remote control selections, can turn the receiver on and off, change channels and activate the PIP function. It can also "swap" the PIP displayed program for the full displayed program in response to the viewer's selection. The logic which performs this switching usually incorporates a memory means which remembers which input, i.e. the main input or the auxiliary input, was last provided to the PIP display 50, when the television receiver is shut off. As a result, if the receiver is turned off when the auxiliary input is coupled to the full display, and then turned on again while the auxiliary input is off, snow will appear on the full display until the viewer takes the appropriate action. Such control circuits, and microcode, are well known in the art and will not be discussed in detail herein.

Figure 2:
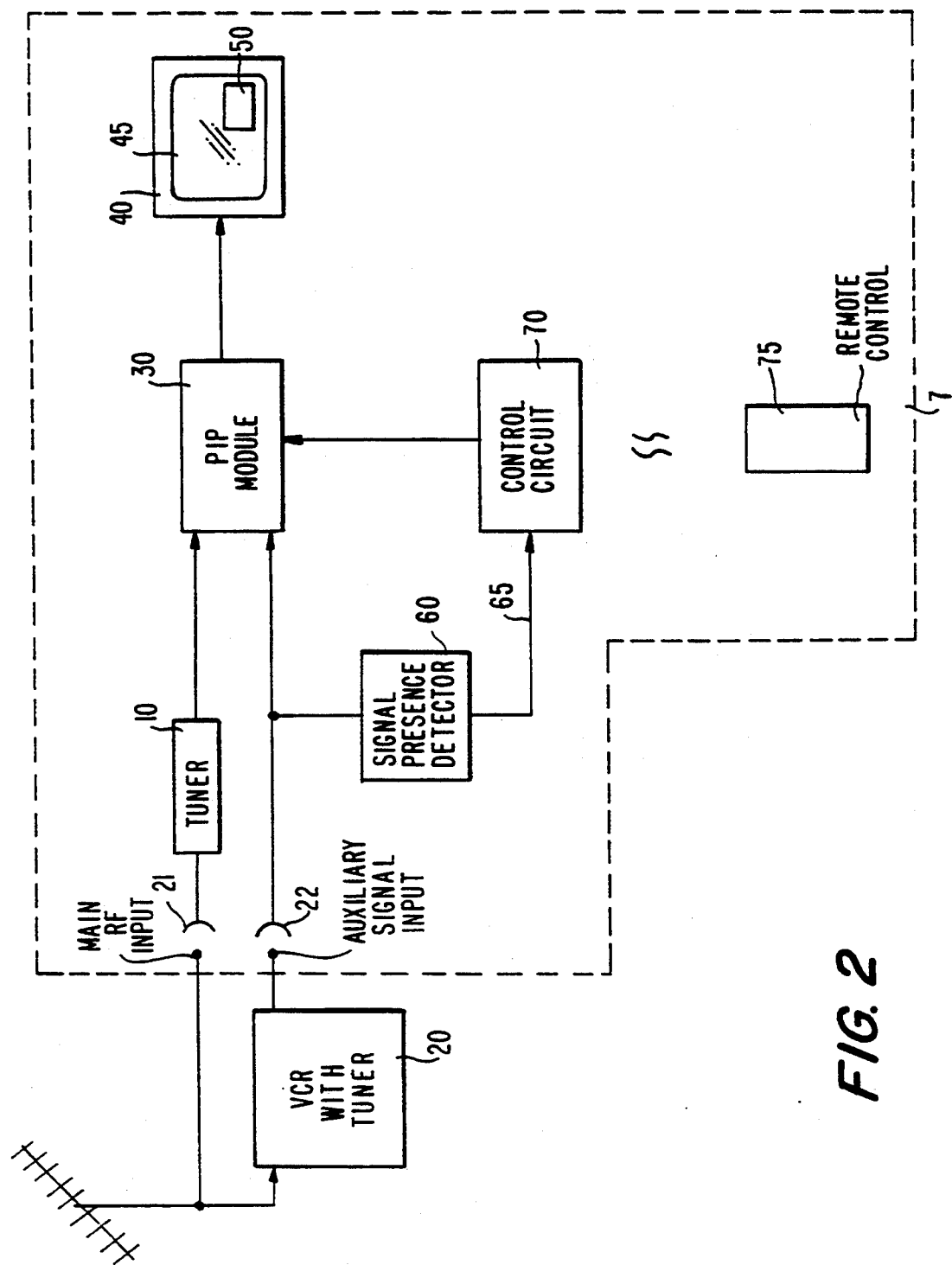
FIG. 2 is a block diagram of a television system incorporating the invention.

In accordance with the invention, which seeks to improve the user to receiver interface, a signal presence detector 60, is disposed between auxiliary input 22 and control circuit 70, as shown in FIG. 2. Circuits which can function as a signal presence detector 60, for example a gate circuit which changes state upon detecting a rectified sample of an AC input signal, are well known in the art and will not be described in further detail herein.

Figure 3:
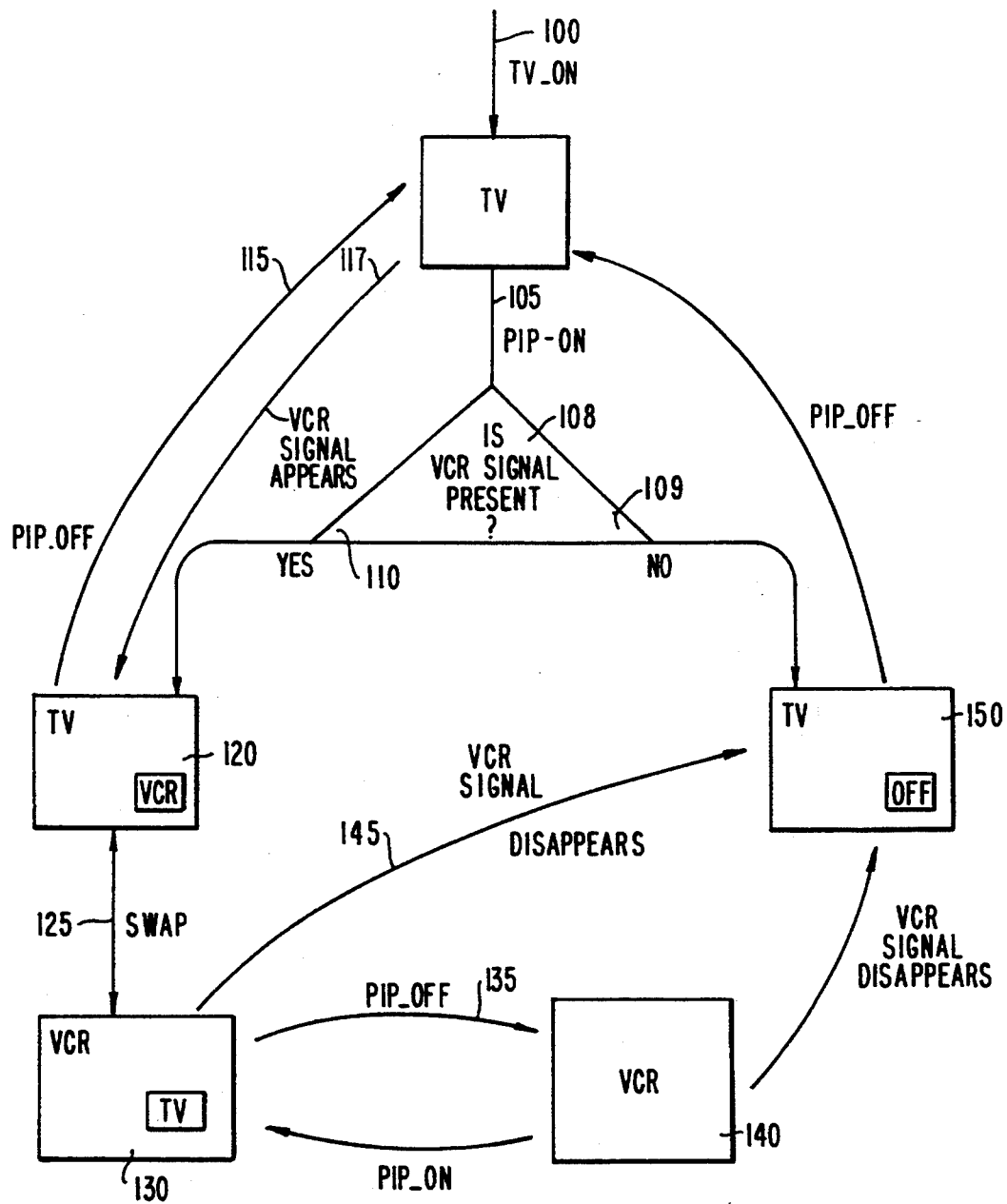
FIG. 3 is a flow chart describing the invention.

Control of the system in accordance with the invention, is provided by microcode programmed into control circuit 70, which is a modification of typical control programs used in such devices to provide menu displays and switching functions in response to remote control commands. FIG. 3 is a flow chart which describes the switching functions comprised by the invention. Using the flow chart, in conjunction with the disclosure, a programmer skilled in the art can adapt existing control programs to implement the invention without undue experimentation.

Assuming the receiver 7 is switched on (applying power to all circuits) and a tuner signal denoted as TV) is provided 100 to the full display 45 (via the input from tuner 10), when VCR 20 is activated 117, the resulting signal (denoted as VCR) supplied via auxiliary input 22 is detected by signal presence detector 60, causing a presence signal 65 from detector 60 to change state (High to Low, or vice versa), thereby activating a software (or hardware) switch in control circuit 70 which in turn activates PIP module 30 and switches the VCR input 22 via PIP module 30, to the PIP display 50. The VCR input is thus automatically provided to the PIP display 50 when the auxiliary input appears at detector 60, This is shown at 120, with TV shown as the full display 45.

Alternatively, the same result 120 could be reached by first activating PIP manually 105. Assuming the VCR is turned on 110, the presence signal 65 causes the control circuit 70 to provide the VCR input to PIP as described above. If the VCR is not activated, or turned off, while PIP is activated 109, then the detector 60 senses the loss (or absense) of VCR input and provides an opposite state signal 22 to control circuit 70, activating a software (or hardware) switch which provides a message (similar to an on screen menu) notifying the viewer that the VCR is "OFF" 150.

The VCR input is thus automatically displayed to the viewer, when it becomes available, and if desired, the viewer can "swap" 125 the VCR and TV programs 130 by touching the appropriate button on remote control 75.

In the "non-swapped" mode 120, if PIP is turned off by the viewer 115, the VCR input is not displayed. In the "swapped" mode 130, if PIP is turned off by the viewer 135, only the VCR input is displayed. Of course, in both the "non-swapped" and "swapped" modes, the viewer can always manually activate and deactivate PIP using the remote control 35.

In the "swapped" mode 130, if the VCR input is lost, (for example, if the VCR is turned off or disconnected 145) the detector 60 senses the loss of VCR input and provides an opposite state signal 22 to control circuit 70, activating a software (or hardware) switch which couples the TV input to the full display and provides a message (similar to an on screen menu) notifying the viewer that the VCR is "OFF" 150. Alternatively, the loss of signal indicator 22 could automatically "swap" the TV and VCR programs and turn off PIP. Similarly, when PIP is off and only the VCR input is displayed 140, if the VCR input is lost, indicator signal 22 will display the TV input in full display, with the VCR "OFF" message, or alternatively merely cause the TV input to be displayed without displaying the "OFF" message.

If PIP is selected by the viewer and no VCR input is available, the indicator signal 22, indicating the absence of the VCR input, would cause the VCR "OFF" message to be displayed 150.

While certain representative embodiments and details have been shown for the purpose of illustrating the present invention, it will be apparent to persons skilled in the art that various modifications may be made in the disclosed systems without departing from the spirit and the scope of the disclosed invention.

I claim:

1. A television receiving system for indicating the availability of an auxiliary program source input, comprising:

a main input for receiving a first program source input;

an auxiliary input for receiving the auxiliary program source input;

display means coupled to said main input and said auxiliary input for supplying a full display and a PIP display;

detection means coupled to said auxiliary input for detecting the auxiliary program source input at said auxiliary input; and automatic PIP selection means for (1) automatically, upon said detection means detecting the auxiliary program source input at said auxiliary input, activating said PIP display, and (2) automatically providing the auxiliary program source input, regardless of the presence of the first program source input at said main input, to said PIP display for signaling a user of said television receiving system that the auxiliary program source input is present at said auxiliary input without said user having to manually select said PIP display for viewing.

2. The television receiving system according to claim 1, further including means for automatically providing a signal indicating the auxiliary program source input is no longer present at said auxiliary input upon said detection means failing to detect the auxiliary program source input at said auxiliary input after said PIP display is automatically activated.

3. The television receiving system according to claim 1, wherein said detection means includes VCR detection means for detecting a VCR output at said auxiliary input, and upon a user activating said VCR said VCR output is provided at said auxiliary input and automatically displayed on said PIP display.

4. A method of providing a PIP display on a television receiver for indicating the availability of an auxiliary program source input, which television receiver includes a main input, an auxiliary input, a full display and a PIP display, said method comprising the steps of:
   receiving a first program source input at said main input;
   receiving an auxiliary program source input at said auxiliary input;
   detecting the auxiliary program source input at said auxiliary input;
   automatically activating said PIP display, without a user of said television receiving system having to manually select said PIP display, if the auxiliary program source input is detected at said auxiliary input; and
   supplying the auxiliary program source input to said PIP display, regardless of the presence of the first source input at said main inquest.

5. The method according to claim 4, wherein said detecting step further includes the step of detecting a transition from the absence of the auxiliary program source input at said auxiliary input to the presence of the auxiliary program source input at said auxiliary input and said step of automatically activating said PIP display only occurs if said detecting step detects the transition.

* * * * *